(12) United States Patent
Walter et al.

(10) Patent No.: US 9,407,688 B2
(45) Date of Patent: Aug. 2, 2016

(54) MAPPING UNIVERSAL PLUG AND PLAY DISCOVERED ITEMS TO AN SMB LOCATION

(71) Applicant: Microsoft Corporation, Redmond, WA (US)

(72) Inventors: James Walter, Fall City, WA (US); Daniel Plastina, Sammamish, WA (US); Kasy Srinivas, Sammamish, WA (US); Anders Klemets, Redmond, WA (US); William F. Schiefelbein, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/155,620

(22) Filed: Jan. 15, 2014

(65) Prior Publication Data

US 2014/0129684 A1      May 8, 2014

Related U.S. Application Data

(63) Continuation of application No. 11/495,420, filed on Jul. 28, 2006, now Pat. No. 8,667,076.

(51) Int. Cl.
*H04L 29/08* (2006.01)
*H04L 29/12* (2006.01)
*H04L 29/06* (2006.01)

(52) U.S. Cl.
CPC ............ *H04L 67/06* (2013.01); *H04L 61/1582* (2013.01); *H04L 67/02* (2013.01); *H04L 67/16* (2013.01); *H04L 65/4084* (2013.01)

(58) Field of Classification Search
None
See application file for complete search history.

(56) References Cited

U.S. PATENT DOCUMENTS

| 5,764,887 | A | 6/1998 | Kells |
| 5,987,525 | A | 11/1999 | Roberts |
| 6,292,848 | B1 | 9/2001 | Plyler |
| 6,968,345 | B1 | 11/2005 | Muhlestein |

(Continued)

FOREIGN PATENT DOCUMENTS

| AU | 2007277040 B2 | 1/2008 |
| JP | 18197358 A | 7/2006 |

(Continued)

OTHER PUBLICATIONS

International Search Report PCTIUS2007/017007, Jan. 14, 2008, pp. 1-12.

(Continued)

*Primary Examiner* — Saleh Najjar
*Assistant Examiner* — Shu Chun Gao
(74) *Attorney, Agent, or Firm* — Judy Yee; Sunah Lee; Micky Minhas

(57) ABSTRACT

An arrangement is provided in which a Universal Plug and Play (UPnP) device exposes a service for mapping a UPnP discovered content item to a server message block (SMB) location. The service is arranged to expose an SMB share path to a user at a remote client using a UPnP protocol, The user is then enabled with access to the share via SMB to gain file access, write changes or exercise file level control of the discovered content item. Authentication is optionally utilized to verify that the user is authorized to receive the SMB share location from the service or to verify that the user is authorized to access the SMB share.

20 Claims, 9 Drawing Sheets

(56) References Cited

U.S. PATENT DOCUMENTS

| | | |
|---|---|---|
| 2002/0027569 A1 | 3/2002 | Manni |
| 2003/0217136 A1 | 11/2003 | Cho |
| 2004/0243694 A1 | 12/2004 | Weast |
| 2004/0243700 A1 | 12/2004 | Weast |
| 2005/0108430 A1* | 5/2005 | Howarth et al. ............. 709/245 |
| 2005/0125357 A1 | 6/2005 | Saadat |
| 2005/0138193 A1 | 6/2005 | Encarnacion |
| 2005/0149481 A1* | 7/2005 | Hesselink et al. ................ 707/1 |
| 2005/0198336 A1 | 9/2005 | Eytchison |
| 2006/0056408 A1 | 3/2006 | Cho |
| 2006/0068911 A1 | 3/2006 | Pirich |
| 2006/0173853 A1* | 8/2006 | Morris ............................ 707/10 |
| 2006/0200570 A1* | 9/2006 | Stirbu et al. ................... 709/230 |
| 2007/0039055 A1 | 2/2007 | Plastina |
| 2007/0288550 A1 | 12/2007 | Ise |

FOREIGN PATENT DOCUMENTS

| | | |
|---|---|---|
| JP | 2006524848 | 11/2006 |
| WO | 2005031605 | 4/2005 |
| WO | 2005043408 | 5/2005 |

OTHER PUBLICATIONS

Paul Castro, "Locating Application Data Across Service Discovery Domains", Jul. 2001, 15 pages, downloaded at: http://www.cs.unc.edu/-maria/mobicom01.pdf.

Ritchie, "MediaRenderer:1 Device Template Version 1.01" Jun. 25, 2002,12 pages, downloaded at: http://www.upnp.org/standardized-dcps/documents/MediaRenderer1.0_000.pdf.

Choy, "Developing Innovative Devices Using Universal Plug and Play (UPnP)" Jan. 2004, 9 pages downloaded at: http://www.simpledevices.com/BuildingInnovativeUPnPDevices.pdf.

Office Action and Search Report dated Jan. 31, 2013 in connection with corresponding Malaysian Patent Application No. PI 20085370 (3 pages).

MX Office Action for Application No. MX/a/2009/000860, Apr. 3, 2013.

MX Office Action for Application No. MX/a/2009/000860, Jun. 6, 2012.

JP Notice of Rejection for Application No. 2009-522818, Dec. 1, 2011.

IL Notification of Defects in Patent Application No. 195784, Mar. 18, 2012.

AU Examiner's First Report on patent application No. 2007277040, Reference 30697000/DBW, May 25, 2011.

AU Examiner's report No. 2 on patent application No. 2007277040, Reference 30697000/NNR/il, Sep. 12, 2011.

AU Examiner's report No. 3 on patent application No. 2007277040, Reference 30697000/DBW/SPM/TRN, Jan. 31, 2012.

MX Office Action for Application No. MX/a/2009/000860, Aug. 26, 2013.

CA Office Action for Application No. 2,655,832, Oct. 4, 2013.

KR Notice of Preliminary Rejection for Application No. 10-2008-70001651, Oct. 29, 2013.

KR Final Notice of Preliminary Rejection for Application No. 10-2009-7001651, May 9, 2014.

CA Office Action for Application No. 2,655,832, Jul. 29, 2014.

CN Office Action and Examination Search Report for Application No. 2,655,832, Apr. 30, 2015.

U.S. Appl. No. 11/495,420, filed Jul. 28, 2006, Walter.

CA Office Action for Application No. 2,655,832, Dec. 17, 2015.

IL Notification of Defects for Application No. 195784, Mar. 18, 2012.

* cited by examiner

```xml
<?xml version="1.0"?>

<SOAP-ENV:Envelope xmlns:SOAP-ENV="http://schemas.xmlsoap.org/soap/envelope/" SOAP-ENV:encodingStyle="http://schemas.xmlsoap.org/soap/encoding/">

<SOAP-ENV:Body><m:SearchResponse xmlns:m="urn:schemas-upnp-org:service:ContentDirectory:1"><Result xmlns:dt="urn:schemas-microsoft-com:datatypes" dt:dt="string">

<DIDL-Lite xmlns:dc="http://purl.org/dc/elements/1.1/"xmlns:upnp="urn:schemas-upnp-org:metadata-1-0/upnp/"xmlns="urn:schemas-upnp-org:metadata-1-0/DIDL-Lite/">

<item id="{A238DC89-4D2B-41E9-ADA4-7EAA61DDF4D3}.0.ED03B2A3" restricted="1" parentID="ED03B2A3">

<dc:title> A Horse Named Blue</dc:title>

<res size="4462911" duration="0:03:03.000" bitrate="24002" protocolInfo="http-get:*:audio/x-ms-wma:*" protection="Microsoft WM DRM" sampleFrequency="44100" bitsPerSample="16" nrAudioChannels="2">http://10.194.65.100:10243/WMPNSSv3/847081666/2_e0EyMzhEQzg5LTREMkItNDFFOS1BREE0LTdFQUE2MURERjREM30uMC5FRDAzQjJBMw.wma</res>

<res size="4462911" duration="0:03:03.000" bitrate="24002" protocolInfo="http-get:*:audio/x-ms-wma:*" protection="Microsoft WM DRM" sampleFrequency="44100" bitsPerSample="16" nrAudioChannels="2">\\10.194.65.100\toby\JC-ahorsenamedblue.wma</res>

<upnp:class>object.item.audioItem.musicTrack</upnp:class>

<upnp:genre>Country</upnp:genre>

<upnp:artist role="AlbumArtist">Johnny Cowboy</upnp:artist>

<upnp:artist role="Performer">Johnny Cowboy</upnp:artist>

<upnp:album>100 Biggest Cowboy Hits</upnp:album>

</item>

</DIDL-Lite>

</Result>

<NumberReturned xmlns:dt="urn:schemas-microsoft-com:datatypes" dt:dt="ui4">1</NumberReturned>

<TotalMatches xmlns:dt="urn:schemas-microsoft-com:datatypes" dt:dt="ui4">1</TotalMatches>

<UpdateID xmlns:dt="urn:schemas-microsoft-com:datatypes" dt:dt="ui4">8</UpdateID></m:SearchResponse>

</SOAP-ENV:Body>

</SOAP-ENV:Envelope>
```

FIG. 5

MAPPING UNIVERSAL PLUG AND PLAY DISCOVERED ITEMS TO AN SMB LOCATION

RELATED APPLICATIONS

This Application is a Continuation of and claims benefit from U.S. patent application Ser. No. 11/495,420 that was filed on Jul. 28, 2006, and that is incorporated herein by reference in its entirety.

BACKGROUND

With the addition of device level Plug and Play (PnP) capabilities it became a great deal easier to setup, configure, and add peripherals to consumer electronic devices and personal computers (PCs). Universal Plug and Play (UPnP™) extends this simplicity to include the entire network, enabling discovery and control of networked devices and services, such as network-attached printers, Internet gateways, and consumer electronics equipment. The UPnP networking protocols are promulgated by the UPnP Forum which is an industry initiative designed to enable simple and robust connectivity among stand-alone devices and PCs from many different vendors.

UPnP is more than just a simple extension of the Plug and Play peripheral model. It is designed to support zero-configuration, "invisible" networking, and automatic discovery for a breadth of device categories from a wide range of vendors. With UPnP, a device can dynamically join a network, obtain an IP (internet protocol) address, convey its capabilities, and learn about the presence and capabilities of other devices—all automatically to thereby facilitate the construction of zero configuration networks. Devices can subsequently communicate with each other directly using peer-to-peer networking to access and share content.

The variety of devices that can benefit from a UPnP enabled network are large and include, for example, intelligent appliances, wireless devices, and PCs of all form factors. The scope of UPnP is large enough to encompass many existing and new applications in such areas as home automation and networking, printing and imaging, audio/video entertainment, kitchen appliances, automobile networks, and mobile device network among others.

UPnP is a distributed, open network architecture that is independent of any particular operating system, programming language, or physical medium. However, UPnP uses standard protocols such as TCP/IP (Transmission Control Protocol/Internet Protocol), HTTP (Hypertext Transfer Protocol) and XML (eXtensible Markup Language), enabling it to seamlessly fit into existing networks. Using such standardized protocols allows UPnP to benefit from interoperability as an inherent feature.

UPnP uses a content directory service that implements a set of functions to provide access to content items (e.g., data files, music, software, pictures, video, games etc.) stored in a content repository on a local UPnP device to remote UPnP devices on the UPnP network. The function of a content directory service is to allow browsing and searching of the content items in the repository. Each content item that is referenced in the content directory service includes various information about that content including the transfer protocols and file formats that the local device can use to transfer the content items to a remote device. As with all UPnP services, remote devices interact with the content directory service using Simple Object Abstraction Protocol (SOAP) calls using HTTP.

After the desired content item has been identified, for example, using a resource or <res> tag in an XML document, the remote device uses the transfer protocol information from the content directory service to match it with the capabilities of a media player in the remote device. Common transfer protocols include HTTP GET and RTSP/RTP (Real Time Streaming Protocol, Real Time Transport protocol), for example. Transferred content is then rendered by the remote device using another UPnP service (the AV Transport Control Service), or a non-UPnP out-of-band protocol, to control the flow of the content (e.g., stop, fast forward, rewind, pause, etc.).

While UPnP performs very satisfactorily in many networking applications, current implementations do not provide users of a UPnP device with file access to content items that are discovered on other UPnP devices connected to a network. That is, a user is limited to only being able to see that a content item exists and perhaps make a request for read-only consumption. No write changes to a discovered content item or file level control of the content item may be implemented in the existing UPnP environment.

SUMMARY

An arrangement is provided in which a UPnP device exposes a service for mapping a UPnP discovered content item to a server message block (SMB) location. The service is arranged to expose an SMB share path to a requesting user at a remote client using a UPnP protocol. The user is then enabled with access to the share via the SMB protocol to gain file access, write changes or exercise file level control of the discovered content item. Authentication is optionally utilized to verify that the user is authorized to receive the SMB share location from the service or to verify that the user is authorized to access the SMB share.

In various illustrative examples, a content item is mapped to the most direct available SMB location for a particular user and file. Either an existing UPnP service is extended, or a new UPnP service is utilized, to expose the SMB location to a requesting user in response to a UPnP Browse or Search command through the use of an additional <res> tag that is included in an XML formatted response to the requesting user.

Advantageously, the present arrangement affords users and devices with greater access and control over content items that are discovered opera UPnP network.

DESCRIPTION OF THE DRAWINGS

FIG. 5 is an illustrative XML document that includes a <res> tag which includes an SMB path;

DETAILED DESCRIPTION

Figure 1:
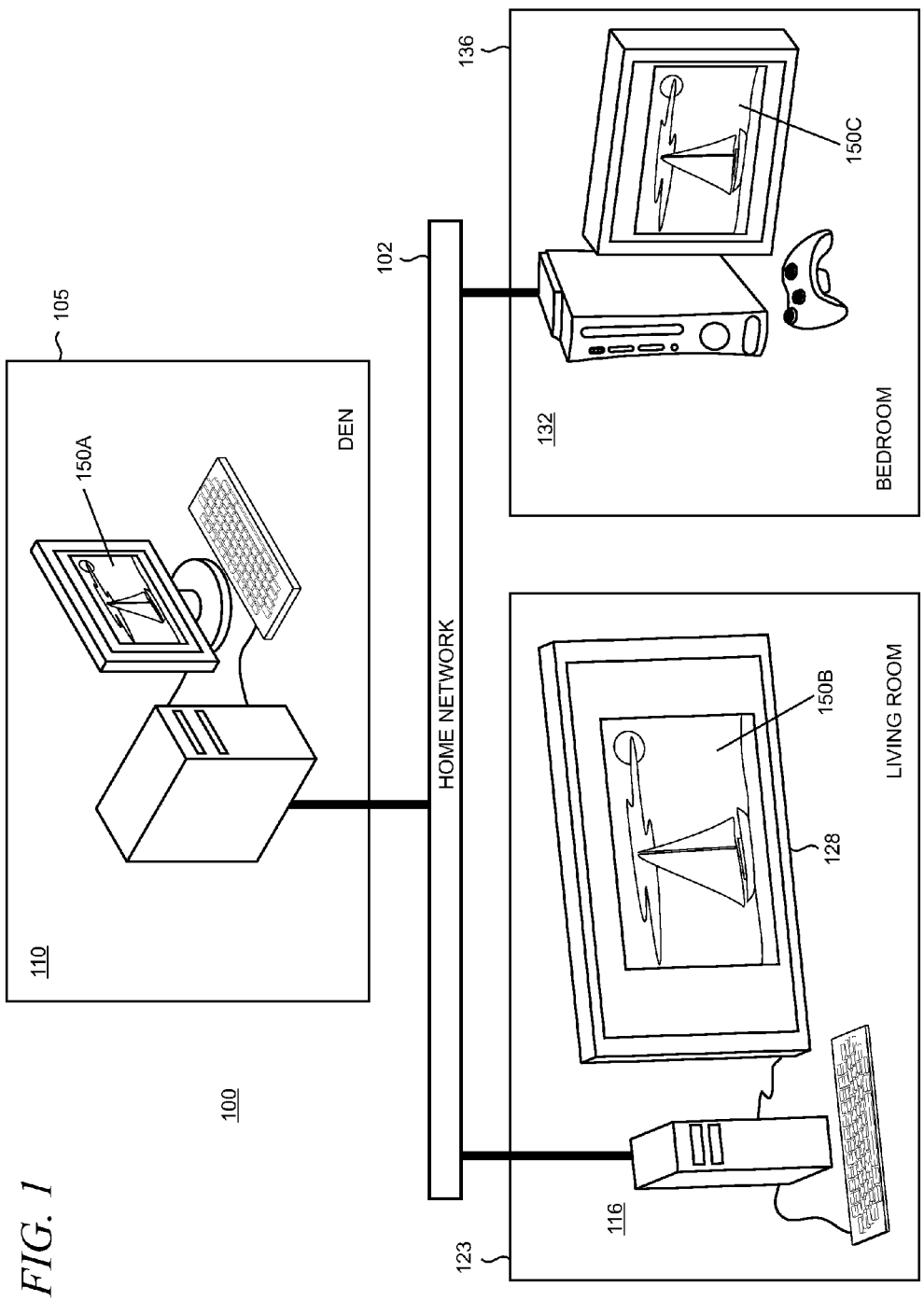
FIG. 1 is a pictorial representation of an illustrative home network that is arranged to utilize UPnP.

Turning to the drawings, where like numerals designate like components or elements, FIG. 1 is a pictorial representation of an illustrative home 100 in which a variety of devices are coupled to a home network 102. In the den 105 of the home 100, a PC 110 stores a family's photographs. A second PC 116 is located in the living room 123 and coupled to a big screen television 128. A game console 132 is located in a bedroom 136. PC 110, PC 116 and game console 132 are each coupled to home network 102 which, in this illustrative example, is arranged as a UPnP network. UPnP networks may be arranged using a variety of network media including, for example, phone line, power line, Ethernet, wireless RE (radio frequency), and IEEE 1394 (Institute of Electrical and Electronic Engineers).

Using the present arrangement for mapping UPnP discovered items to an SMB location, the family can gather in the living room 123 and view the photographs stored on PC 110 on the big screen television 128. Using PC 116, the family is able to rate the photographs, rotate them and even rename the photographs from the living room 123. These capabilities are enabled using the viewing properties of UPnP and HTTP while adding file operations over SMB in accordance with the present arrangement. An illustrative family photograph is stored on PC 110 and rendered as an image 150A on a monitor coupled to PC 110, image 150B on big screen television 128, and image 150C on a monitor coupled to game console 132, as shown in FIG. 1.

SMB is a network file sharing protocol at the application/presentation layer in the OSI (Open Systems Interconnection) networking model. Accordingly, SMB may run over multiple lower layer protocols including, for example, NetBIOS (Network Basic Input/Output System) over TCP/IP, NetBEUI (NetBIOS Extended User Interface), or IPX/SPX (Internetwork Packet Exchange/Sequenced Packet Exchange).

The set of message packets that defines a particular version of the SMB protocol is called a dialect. For example, CIFS (Common Internet File System refers to the SMB dialect that was first implemented in the Microsoft Windows NT operating system, SMB and CIFS are also available on VMS (Virtual Memory System), several versions of Unix, and other operating systems. All dialects of SMB, including CIFS, are usable in the present arrangement and the particular SMB version or dialect selected will depend on the specific requirements of an application of mapping UPnP discovered content. The term "SMB" as used herein is intended to apply to all such SMB versions or dialects.

Figure 2:
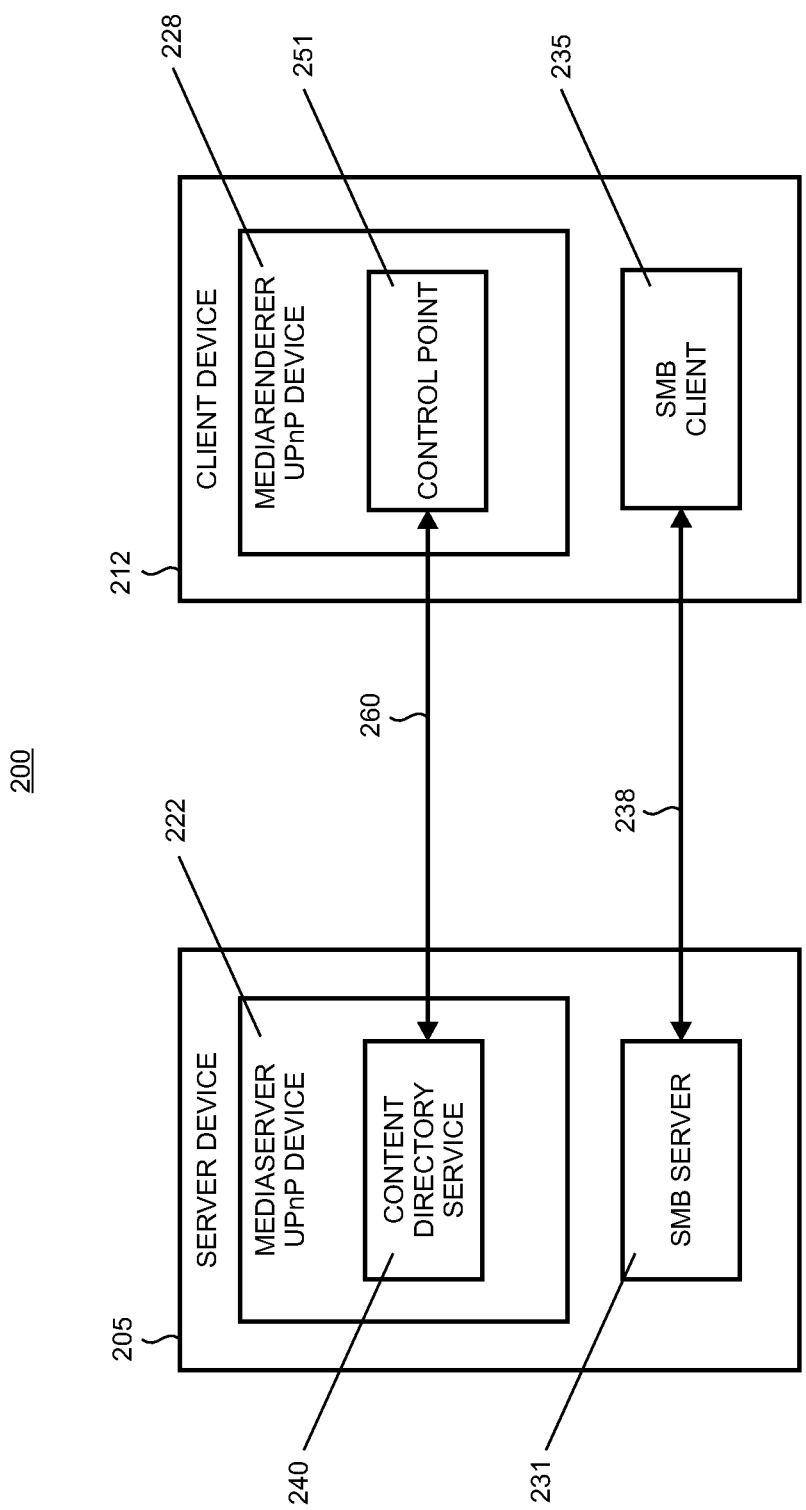
FIG. 2 is a block diagram of a illustrative server and client architecture.

FIG. 2 is a block diagram of a illustrative server and client architecture 200 including a server device 205 and a client device 212 which are each typically configured as a physical device or unit such as a PC, game console etc. For example, server device 205 may be embodied in PC 110 (FIG. 1) to share content items stored thereon such as family photographs, music, games, data, files and the like. Similarly, client device 212 may be embodied in PC 116 (FIG. 1) or game console 132 (FIG. 1) to receive content items from the server device 205.

Server device 205 and client device 212 are arranged with a MediaServer UPnP device 222 and a MediaRenderer UPnP device 228, respectively. UPnP devices are logical devices that do not have to reflect a particular physical set up. That is, a physical device may host several logical UPnP devices and the particular number of UPnP devices selected and their arrangement will depend on the requirements of a particular application of UPnP discovered item mapping. In addition to MediaServer UPnP device 222, server device 205 includes a SMB server 231 that is arranged to communicate with an SMB client 235 in client device 212 over a network as indicated by line 238.

MediaServer UPnP device 222 includes a content directory service 240 that is typically arranged as a Content Directory Service conforming to the definitions published by the UPnP Forum that is extended with additional functionalities described below. Alternatively, content directory service 240 is arranged as new service (named, for example, "SecureContentDirectoryService") that is accessed by requesting clients using existing UPnP protocols.

MediaRenderer UPnP device 228 includes a control point 251. In this illustrative example, control point 251 is a UPnP control point that is embedded in MediaRenderer UPnP device 228 which invokes actions on services while providing any required input parameters and receiving any output parameters, service responses and return values. MediaRenderer UPnP device 228 is typically arranged as a MediaRenderer conforming to the definitions published by the UPnP Forum that instantiates the client device 212 with the capability to render content items received from the server device 205. MediaRenderer UPnP device 228 is commonly configured to expose a set of rendering controls in which the control point 251 can control how a particular content item is rendered. In alternative arrangements of mapping UPnP discovered items to an SMB location, MediaRenderer UPnP device 228 is optionally utilized in cases where the server device 205 and client device 212 interact with each other using a non-UPnP (i.e., an out-of-band) communication protocol. For example, Windows® Media Player and Roku™ SoundBridge may be used to render content items.

In the server-client architecture 200, control point 251 accesses the content directory service 240 over a UPnP network as indicated by line 260 as shown in FIG. 2.

Figure 3:
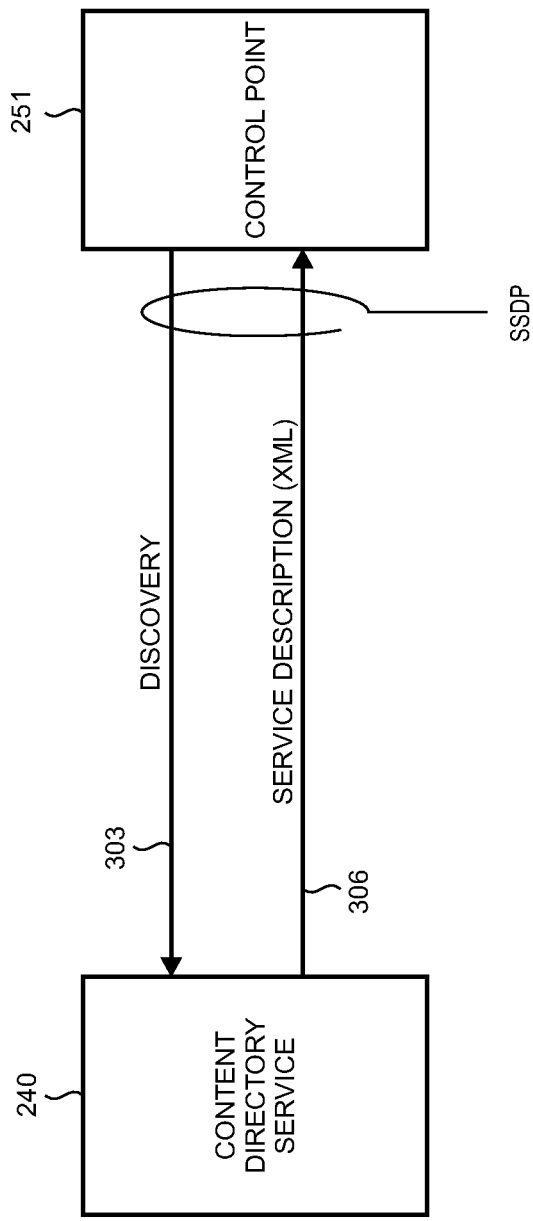
FIG. 3 is a diagram showing an illustrative message flow between a content directory service and a control point.

FIG. 3 is a diagram showing an illustrative message flow between the content directory service 240 and control point 251. Control point 251 is used to discover other devices on a UPnP network such as home network 102 (FIG. 1) by sending a discovery message 303, typically an M-Search command using SSDP (Simple Service Discovery Protocol). Content directory service 240 responds to the M-Search command using a SSDP message that contains the URI (Uniform Resource Identifier) of XML formatted device description documents which, in turn, contain the location of XML service description documents 306 for each available service. Control point 251 can download the service description documents 306 via HTTP, for example. MediaServer UPnP device 222 is thus able to expose content directory service 240 to the control point 251.

Figure 4:
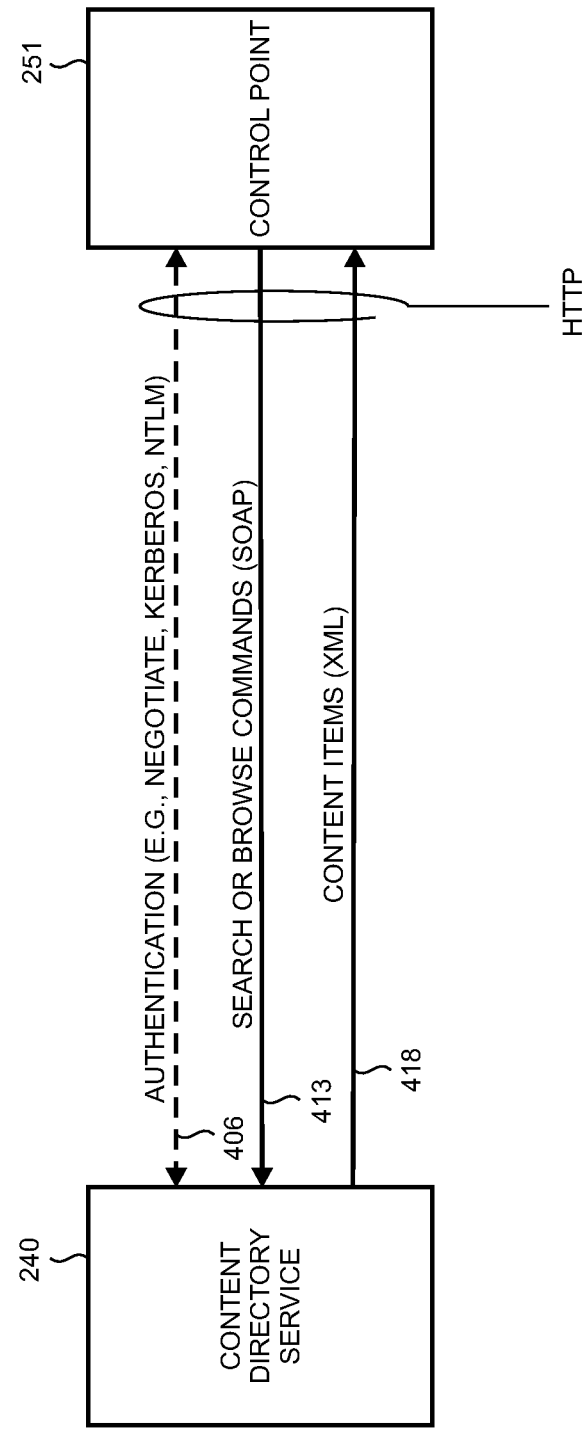
FIG. 4 is a diagram showing another illustrative message flow between a content directory service and a control point.

FIG. 4 is a diagram showing another illustrative message flow between the content directory service 240 and control point 251. Control point 251 connects to the content directory service 240 using an authentication protocol such as Windows Negotiate, Kerberos, NTLM or the like. The use of any authentication process is optional (as indicated by dashed line 406 in FIG. 4). If the authentication negotiation between the content directory service 240 and control point 251 is successful, the control point 251 is able to issue Search or Browse commands to the content directory service 240 using SOAP messages 413 via HTTP. The content directory service 240 responds to the Search or Browse commands with an XML document 418 that exposes a <res> tag entry, typically among other entries, for the discovered content items that are mapped to SMB locations. The mapping is described below in the text accompanying FIGS. 6-8.

FIG. 5 is an illustrative XML document 418 that includes a <res> tag 505 which includes an SMB path. The SMB path is indicated in <res> tag 505 as \\10.194.65.100\toby\JC-myhorsenamedblue.wma which, in this illustrative example, indicates a Windows Media Audio (WMA) file located in a share named "Toby" on PC 110 in FIG. 1 that has an IP address of 10.194.65.100. The WMA file is for a song titled "My Horse Named Blue" that is performed by Johnny Cowboy (where both the song and performer are fictitious). SMB paths for other types of files such as pictures (e.g., Joint Photographic Experts Group or JPEG formatted images having a file extension of .JPG or .JPEG) or video (e.g., Windows Media Video, RealVideo, Apple QuickTime, etc., formatted videos with file extensions of .wmv, .rm or .ram, and .mov, respectively) may be included in one ore more <res> tags in a similar manner.

The XML document 418 also includes a <res> tag 510 which identifies a URL for a WMA file that is accessed using HTTP GET, for example, as is provided by an existing UPnP MediaServer device. The URL is indicated in <res> tag 510 as http://10.194.65,100:10243/WMPNSSv3/847081666/
2_e0EyMzhEQz
g5LTREMkItNDFFOS1BREE0LTdFQUE2MUR-
ERjREM30uMC5FR DAzQjJBMw.wma which, in this illustrative example, is the same WMA music file above using an abstracted path/naming convention that is commonly used.

Figure 6:
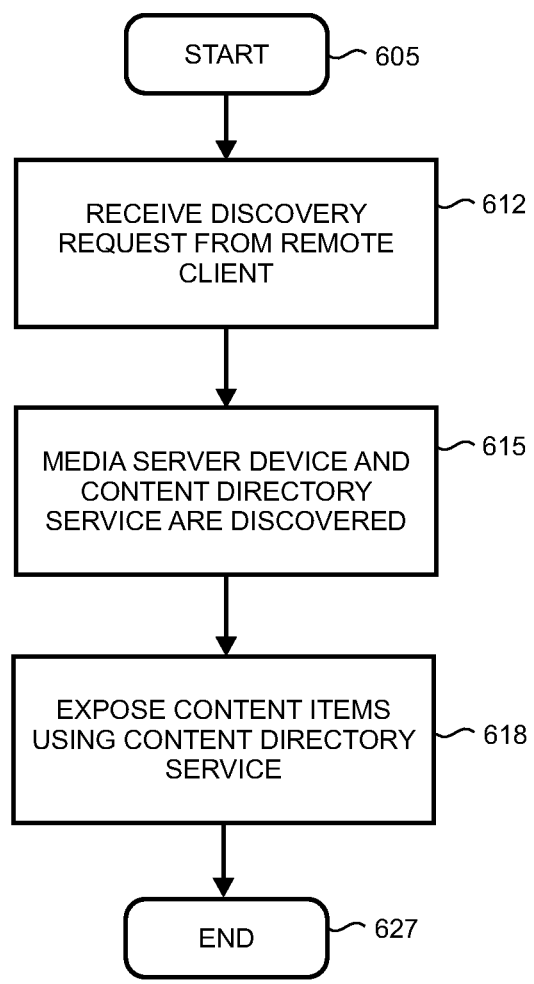
FIG. 6 is a flowchart of an illustrative method for providing a content directory service to a requesting user.

FIG. 6 is a flowchart of an illustrative method 600 for a UPnP device (such as MediaServer UPnP device 222 in FIG. 2) to expose its content items via a content directory service (such as content directory service 240 in FIG. 2) to a requesting user. The requesting user is typically a user of a remotely located electronic device such as client device 212 including MediaRenderer UPnP device 228 in FIG. 2. The illustrative method 600 starts at block 605. At block 612, a discovery message such as an M-Search command is sent from control point 251 (FIG. 2) to search for UPnP devices of interest and is received at the MediaServer UPnP device 222. The MediaServer UPnP device 222 responds to the discovery message to thereby enable MediaServer UPnP device 222 and content directory service 240 to be discovered by the client device 212, as indicated at block 615. The content directory service 240 exposes content items to the requesting user at block 618 to provide various views of the stored content to thereby enable searching and browsing of content items available on. Using detailed descriptions of the content a search query can return a set of content items. Additionally, organization of content is support via containers, which can be used to cluster content similar to directories or folders. The illustrative method 600 ends at block 627.

Figure 7:
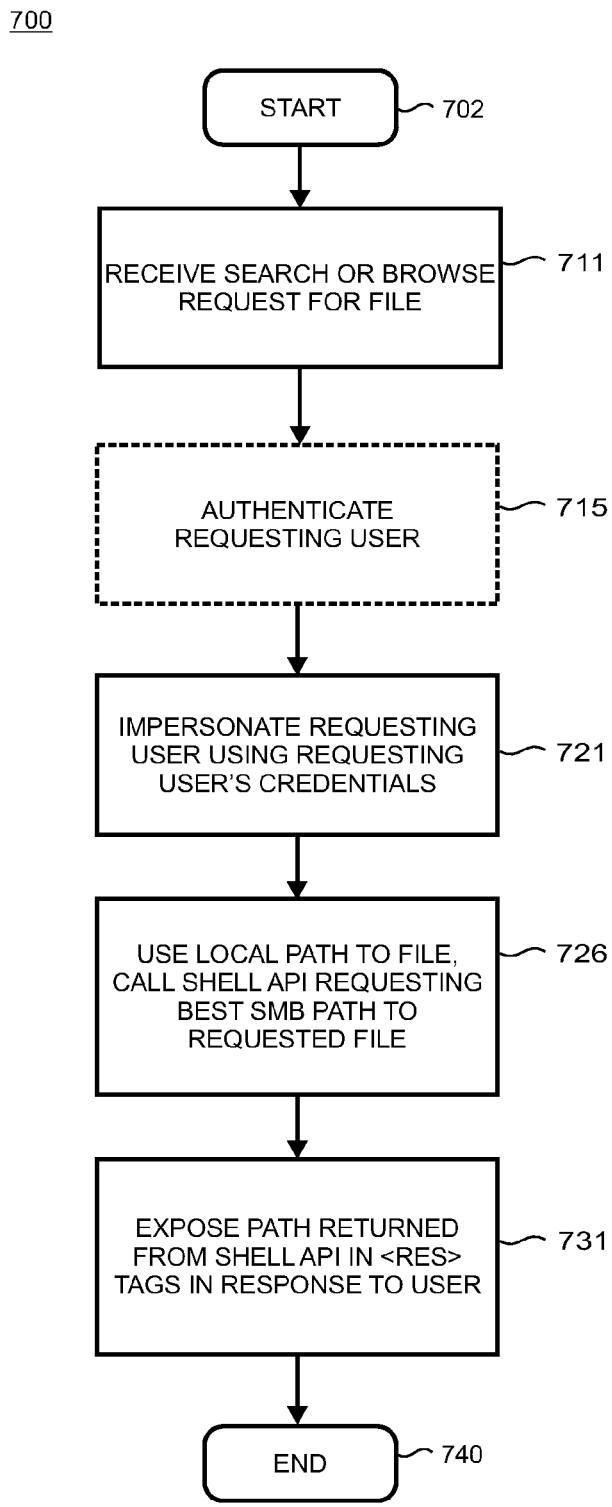
FIG. 7 is a flowchart of an illustrative method for identifying and exposing an SMB share location to a requesting user.

FIG. 7 is a flowchart of an illustrative method 700 for identifying and exposing an SMB share location to a requesting user using the content directory service provided in the method 600 (FIG. 6) above. The SecureContentDirectory service noted above is usable to perform method 700. Alternatively, the existing UPnP Content Directory Service may be extended to perform the steps shown in FIG. 7.

The illustrative method starts at block 702. At block 711, the content directory service receives a Search or Browse command from a requesting user. An optional authentication step is performed at block 715. The authentication protocol is selected from one of Windows Negotiate, Kerberos, NTLM or the like in most applications.

The content directory service works to map the content item requested in the Search or Browse command at the method step shown in block 711 to the best SMB path. By "best" it is generally meant as the most direct SMB path to which the particular requesting user has access.

Figure 8:
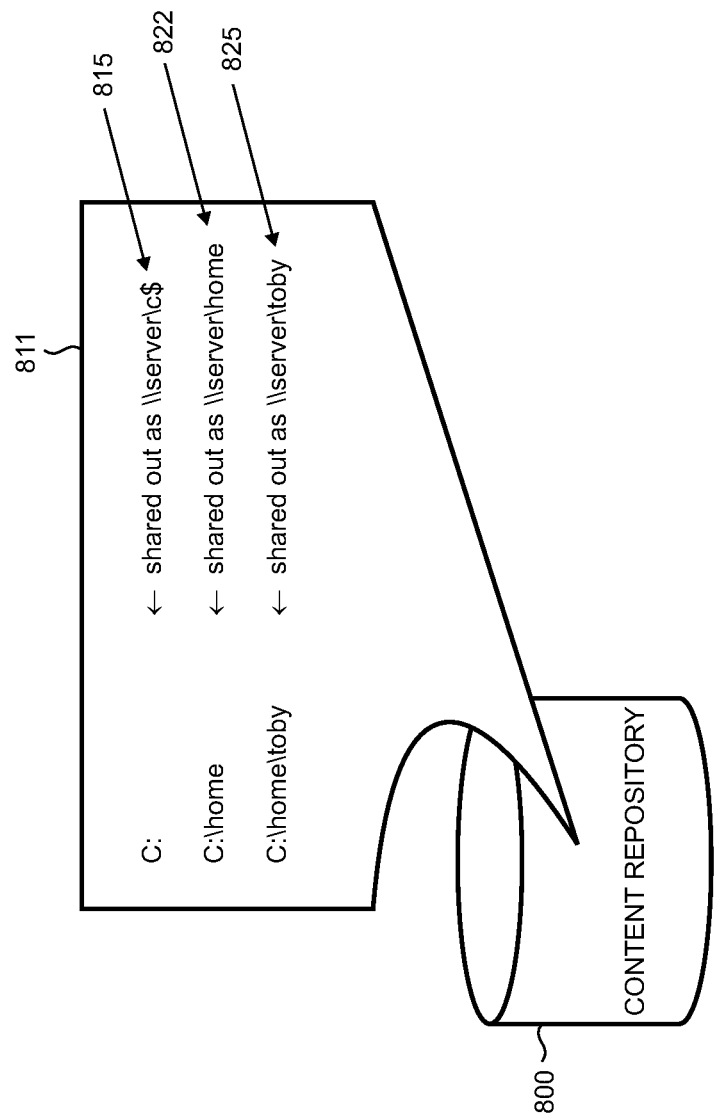
FIG. 8 is a block diagram of an illustrative content repository showing the directory structure contained therein.

The concept of best SMB path is further illustrated in FIG. 8 which is a block diagram of an illustrative content repository 800 showing the directory structure 811 contained therein. Content repository 800 is typically embodied as a memory such as a hard disk drive in a device such as PC 110 in FIG. 1. As shown in FIG. 8, directory structure 811 includes three shares 815, 822 and 825. In this illustrative example, there are three users of PC 110 including an Admin, Dad and Toby. A remote user wishing to access files in c:\home\toby would thus have three potential ways of accessing the files through each of the respective shares 815, 822 and 825. Admin has access to each of the shares 815, 822 and 825 while Dad has access to both the Home share 822 and Toby share 825. Accordingly, to identify the best SMB path to expose, the UNC (Universal/Uniform Naming Convention) path is determined based on the file contained in the request and the credentials of the requesting user.

If Toby requests the file in the Toby share, the only available and best UNC path to expose is \\server\toby\filename.

If Dad wants access to the same file, then there are two options based on Dad's access level:

A. \\server\toby\filename
B. \\server\home\toby\filename

In this example, Option A is the best option because it represents the most direct path. The media server service accordingly selects \\server\toby\filename as the best SMB path if Dad is the requesting user.

Admin is requesting access, there are three options:

A. \\server\toby\filename
B. \\server\home\toby\filename
C. \\server\cS\home\toby\filename In this example, Option A is again the best option because it represents the most direct path. The media server service accordingly selects \\server\toby\filename as the best SMB path if Admin is the requesting user.

Returning to FIG. 7, the media server service impersonates the requesting user using the requesting user's credentials at block 721. At block 726, the media server service, by using the local path to the requested file and acting as the impersonated requesting user, calls a shell API (application programming interface) requesting the best SMB path to the requested file. If the shell API returns with a SMB path, the media server service will include that path in a <res> tag included in the XML response to the requesting user's Search or Browse command as indicated at block 731. Illustrative method 700 ends at block 740.

Figure 9:
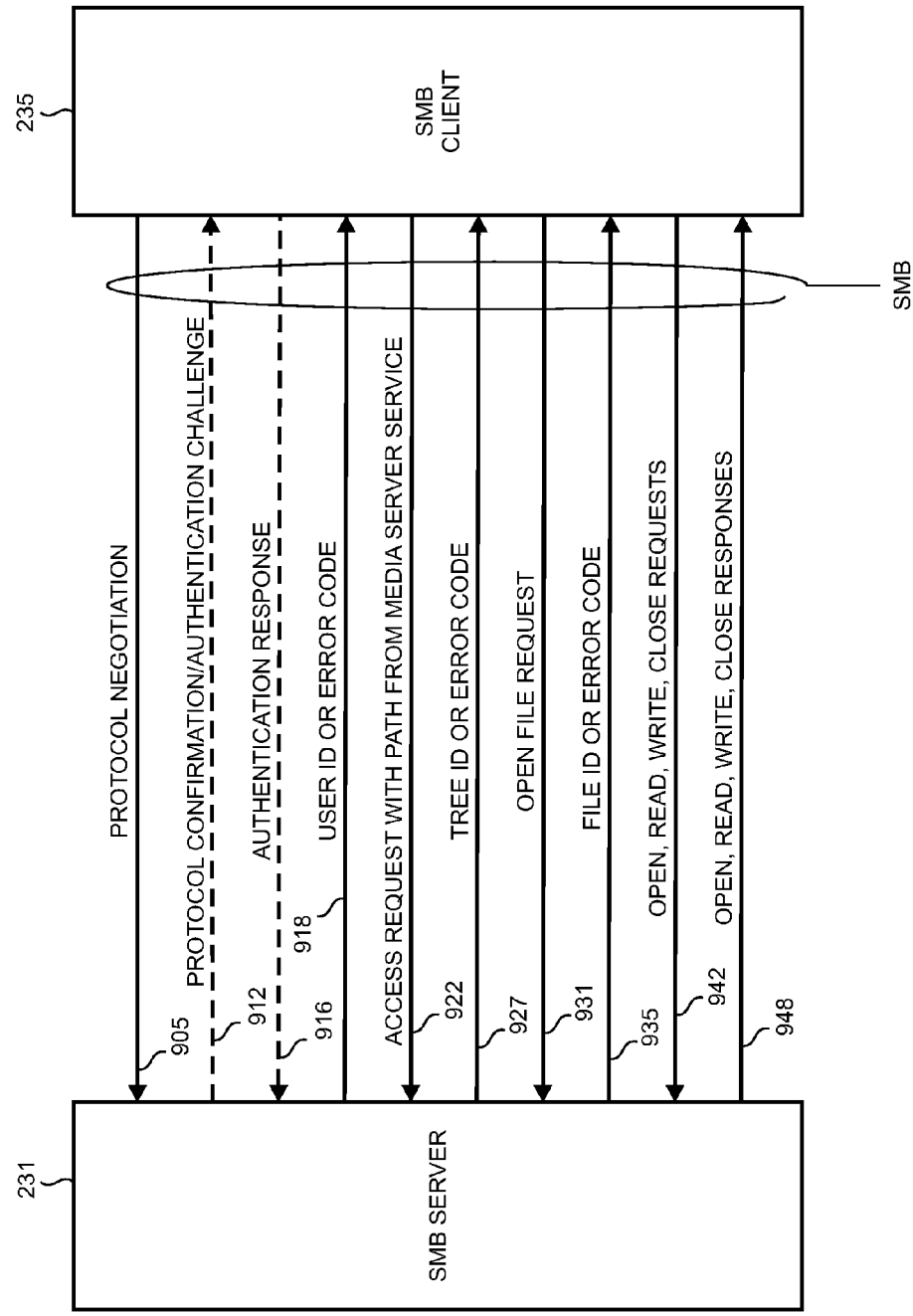
FIG. 9 is a diagram showing an illustrative message flow between an SMB server and an SMB client.

Turning now to FIG. 9, a diagram showing an illustrative message flow between the SMB server 231 (FIG. 2) and an SMB client 235 (FIG. 2) is presented. The illustrative messages comprise packets that are exchanged between SMB server 231 and SMB client 235 using the SMB protocol after the media server service exposes the SMB path to the requesting user as described above.

In this illustrative example, the SMB client 235 and SMB server 231 first establish a fall duplex TCP connection. Then the SMB client 235 builds and sends a NetBIOS session request packet over the TCP connection, If the packet was formatted correctly, the SMB server 231 returns a packet that contains a message acknowledging that the session has been established. After this, the SMB client 235 sends a protocol negotiation message 905 to SMB server 231 to negotiate the particular SMB dialect used for the session.

The SMB server 231 responds to the request from SMB client 235 to identify the SMB dialect that is going to be used in the session. The returned message 912 also includes an 8-byte random string that will be used as an challenge as part of an optional shared-key authentication process. SMB client 235 returns a response to the challenge in message 916 which includes information regarding the capabilities of the SMB client 235. As noted above, authentication is an optional process which is indicated in FIG. 9 by the dashed lines.

If the SMB server 231 accepts the response from the SMB client 235 to the challenge, a valid UID (user ID) is included in the message 918 that is returned to the SMB client 235. If it is not accepted, the SMB server 231 will return an error code in this message and deny access.

The SMB client 235 then requests access to the SMB share contained in the <res> tag exposed by the media server service as described above. The access request message 922 contains the fully specified path of the share in UNC format.

If access to the share is granted, then the SMB server 231 returns the 16-bit tree ID (TID) that corresponds to the share in message 927. If the share does not exist or the user has insufficient credentials to access the share, the server will return an error code in message 927 and deny access to the share.

SMB client 235 requests the SMB server to open a file on the accessed share in message 931. This message contains the name of the file to be opened. For example, referring again to FIG. 5, the name of tile to be opened is JC-ahorsename-blue.wma.

Returning to FIG. 9, if access to the file is granted, then the SMB server 231 returns the file ID of the requested file in message 935. If the file does not exist or the user has insufficient credentials to access the file, the SMB server 231 will return an error code in message 935 and deny access to the file.

SMB client 235 requests the SMB server 231 to variously open the file, read data from the opened file and return this data to the SMB client 235, write to the file or close the file in message 942. Other file operations including renaming, deleting etc, may also be captured by message 942. The file ID that is obtained by the client when the file was opened is included in this message in order to identify from which opened file the SMB server 231 should perform the requested operation. Appropriate responses to message 942 are contained in message 948 from the SMB server 231 to SMB client 235.

Although various illustrative arrangements and methods for mapping UPnP discovered items to an SMB location have been shown and described, it should be understood that the scope of the claims appended hereto shall not necessarily be limited to the specific features, arrangements or methods described. Instead, the specific features, arrangements or methods are disclosed as illustrative forms of mapping UPnP discovered items to an SMB location as more particularly claimed below.

What is claimed is:

1. A method performed on a computing device comprising memory and a universal plug-and-play ("UPnP") control point, the method comprising:
   sending, by the UPnP control point to a UPnP device, a request to access a UPnP-discovered file; and
   receiving, by the UPnP control point from the UPnP device in response to the sent request, a server message block ("SMB") location of the UPnP-discovered file, where the UPnP control point is enabled by the UPnP device to perform a write operation on the UPnP-discovered file at the received SMB location of the UPnP-discovered file based on a mapping between the UPnP-discovered file and the SMB location.

2. The method of claim 1 where the UPnP-discovered file is a content item discovered over UPnP network.

3. The method of claim 1 where the received SMB location comprises a path to the UPnP-discovered file.

4. The method of claim 1 where the request is sent via a UPnP protocol.

5. The method of claim 1 where a user originating the sent request is authorized to access the UPnP-discovered file at the received SMB location.

6. The method of claim 1 further comprising writing to the UPnP-discovered file at the received SMB location of the UPnP-discovered file.

7. A client device comprising:
   a processor;
   memory; and
   a universal plug-and-play ("UPnP") control point configured to:
      send, by the UPnP control point to a UPnP device, a request to access a UPnP-discovered file; and
      receive, by the UPnP control point from the UPnP device in response to the sent request, a server message block ("SMB") location of the UPnP-discovered file, where the UPnP control point is enabled by the UPnP device to perform a write operation on the UPnP-discovered file at the received SMB location of the UPnP-discovered file based on a mapping between the UPnP-discovered file and the SMB location.

8. The client device of claim 7 where the UPnP-discovered file is a content item discovered over a UPnP network.

9. The client device of claim 7 where the received SMB location comprises a path to the UPnP-discovered file.

10. The client device of claim 7 where the request is sent via a UPnP protocol.

11. The client device of claim 7 where a user originating the sent request is authorized to access the UPnP-discovered file at the received SMB location.

12. The client device of claim 7, the UPnP control point further configured to write to the UPnP-discovered file at the received SMB location of the UPnP-discovered file.

13. At least one computer-readable memory device comprising:
   memory comprising software that, based on execution by a client device comprising a processor and a universal plug-and-play ("UPnP") control point, configures the UPnP control point to:
      send, by the UPnP control point to a UPnP device, a request to access a UPnP-discovered file; and
      receive, by the UPnP control point from the UPnP device in response to the sent request, a server message block ("SMB") location of the UPnP-discovered file, where the UPnP control point is enabled by the UPnP device to perform a write operation on the UPnP-discovered file at the received SMB location of the UPnP-discovered file based on a mapping between the UPnP-discovered file and the SMB location.

14. The at least one computer-readable memory device of claim 13 where the UPnP-discovered file is a content item discovered over a UPnP network, or where the sending is via a UPnP protocol.

15. The at least one computer-readable memory device of claim 13 where the received SMB location comprises a path to the UPnP-discovered file.

16. The at least one computer-readable memory device of claim 13 where a user originating the sent request is authorized to access the UPnP-discovered file at the received SMB location.

17. The at least one computer-readable memory device of claim 13, the UPnP control point further configured to write to the UPnP-discovered file at the received SMB location of the UPnP-discovered file.

18. The method of claim 1 where the UPnP control point and the UPnP device are both on the same network.

19. The client device of claim 7 where the UPnP control point and the UPnP device are both on the same network.

20. The at least one computer-readable memory device of claim 13 where the UPnP control point and the UPnP device are both on the same network.

* * * * *